Sept. 22, 1931.   G. MILLER   1,824,165
COLLAPSIBLE TRIPOD
Filed April 11, 1930

INVENTOR:
George Miller,
BY
Bodell & Thompson
ATTORNEYS.

Patented Sept. 22, 1931

1,824,165

UNITED STATES PATENT OFFICE

GEORGE MILLER, OF NORTH SYRACUSE, NEW YORK

COLLAPSIBLE TRIPOD

Application filed April 11, 1930. Serial No. 443,530.

This invention relates to collapsible tripods, and has as its object, the provision of a tripod which may be completely dismantled for ease in shipment.

A further object of the invention is to provide a tripod, each of the legs of which is substantially straight, except for a small bent over portion at one end, and to so shape these bent portions that the three ends of the tripod may be hooked together to provide an assembled structure with no other fastening means.

The invention consists in the novel features and in the combinations and constructions hereinafter set forth and claimed.

In describing this invention, reference is had to the accompanying drawings in which like characters designate corresponding parts in all the views.

Figure 1:
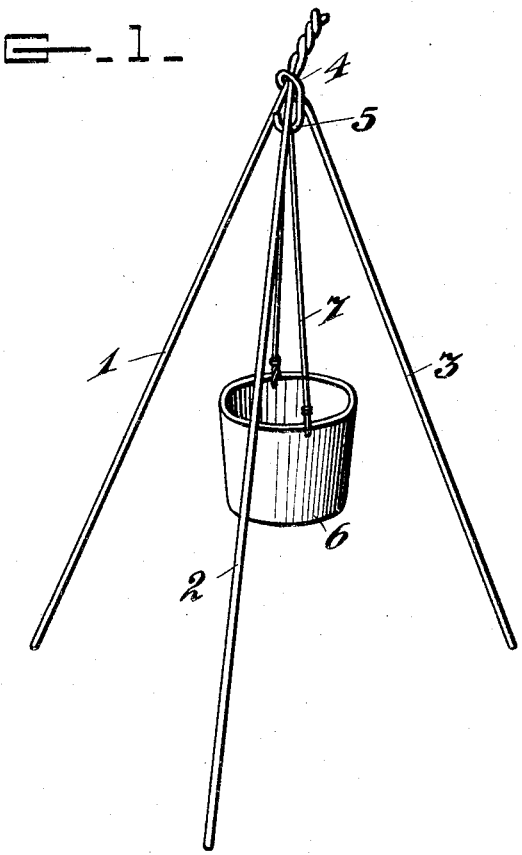
Figure 1 illustrates an assembly view of my improved tripod in perspective.
Figure 2:
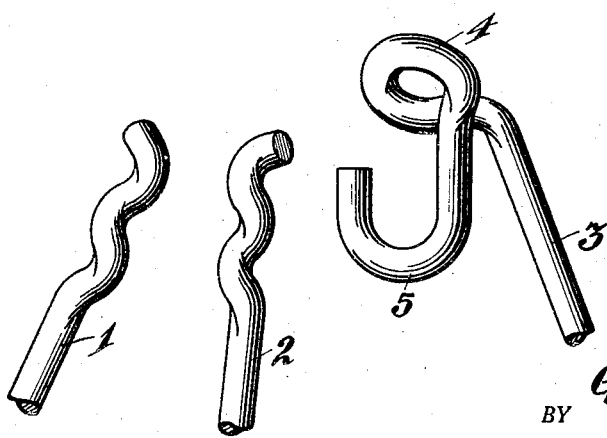
Figure 2 illustrates the end portions of the respective legs of the tripod.

Referring to Figure 1, the legs 1 and 2 are bent at their upper ends into a substantially spiral form. When these spirally bent ends are brought together they may be twisted into engagement to form a spliced connection as ordinarily used to join wires.

A third leg 3 is bent at its upper end into a loop 4 of sufficient diameter to fit over the spliced connection between the legs 1 and 2. The end of the leg 3 beyond the loop 4 may be bent to form a hook 5 from which an object to be supported by the tripod may be hung, as for example a bucket 6 suspended by a cable 7.

When disassembled, the three legs of the tripod will occupy very little space and may be easily carried in a package in much the same as used for fishing poles and similar articles. When it is desired to set up the tripod, the bent ends of the legs 1 and 2 are brought together, given a slight twisting movement to engage as shown in Figure 1.

The loop 4 of the leg 3 is then passed over the joined ends of the legs 1 and 2, and slides down to a point at which the legs 1 and 2 begin to separate, as shown in Figure 1. The tripod is then ready for use, no blocks, bolts or other fastening means being necessary.

While the tripod legs are straight in the preferred embodiment of the invention to facilitate ease in shipment, they may obviously have any desired curve or similar change without departing from the spirit of the invention.

What I claim is:

1. A collapsible tripod including a leg having a bent portion, a second leg having a bent portion adapted to engage with and disengage from the bent portion of the first leg to secure the said legs together, and to separate the said legs, and a third leg having a loop portion adapted to fit over the bent portions of the first and second legs.

2. A collapsible tripod including a leg having a bent end portion, a second leg having a bent end portion adapted to engage with and disengage from the bent end portion of the first leg to secure said legs together at their top ends and to separate the said legs, a third leg having a looped end adapted to fit over the bent end portions of the first and second legs, and a hook formed from the end of said third leg and disposed below the loop portion.

3. In a collapsible tripod in combination, a leg having a bent upper portion, a second leg having a similarly bent portion coacting with said first bent portion and adapted to screw into engagement with said first leg to form a spliced connection between the first and second legs, a third leg having a loop therein adapted to engage over the connected ends of the first and second legs, and a hook formed from the end of said third leg and disposed below the loop portion.

4. A collapsible tripod including a leg having a spirally bent end portion, a second leg having a corresponding spirally bent end portion adapted to engage with and disengage from the bent portion of the first leg upon screwlike movement of one of the legs, and a third leg having a looped portion adapted to fit over the bent portions of the first and second legs to secure said tripod in assembled position.

In testimony whereof, I have hereunto signed my name at Syracuse, in the county of Onondaga, and State of New York, this 20th day of March, 1930.

GEORGE MILLER.